United States Patent [19]
Altman

[11] Patent Number: 5,429,071
[45] Date of Patent: Jul. 4, 1995

[54] ADJUSTABLE ANIMAL FEEDER HOLDER

[76] Inventor: Michael C. Altman, Rte. #4 Box 62-B, Hemingway, S.C. 29554

[21] Appl. No.: 231,820

[22] Filed: Apr. 25, 1994

[51] Int. Cl.$^6$ .............................................. A01K 1/10
[52] U.S. Cl. ................................................... 119/61
[58] Field of Search ............... 119/52.1, 52.2, 52.3, 119/52.4, 57.9, 53, 53.5, 54; 211/208, 190

[56] References Cited
U.S. PATENT DOCUMENTS

| | | | |
|---|---|---|---|
| 1,994,589 | 3/1935 | Langum | 119/61 X |
| 3,780,703 | 12/1973 | Boehland, Jr. | 119/33 |
| 4,889,878 | 12/1989 | Smiley | 119/52.1 X |
| 4,953,506 | 9/1990 | Sanders | 119/61 |
| 5,195,463 | 3/1993 | Lorenzana | 119/52.2 X |

Primary Examiner—Thomas Price

[57] ABSTRACT

An adjustable animal feeder holder for preventing crawling insects from accessing an animal feeder placed thereon comprising a container having a bottom surface and an integral side wall extended upwards from the bottom surface; a platform mechanism coupled to the bottom surface of the container, extended upwards therefrom, and adapted for holding an animal feeder placed thereupon; and an adjustable mechanism coupled to the platform mechanism for adjusting the height of the platform mechanism above the container; whereby when an animal feeder having animal feed disposed therein is placed upon the platform mechanism and liquid is disposed in the container, a moat is created, and the moat prevents crawling insects from accessing the animal feed.

2 Claims, 3 Drawing Sheets

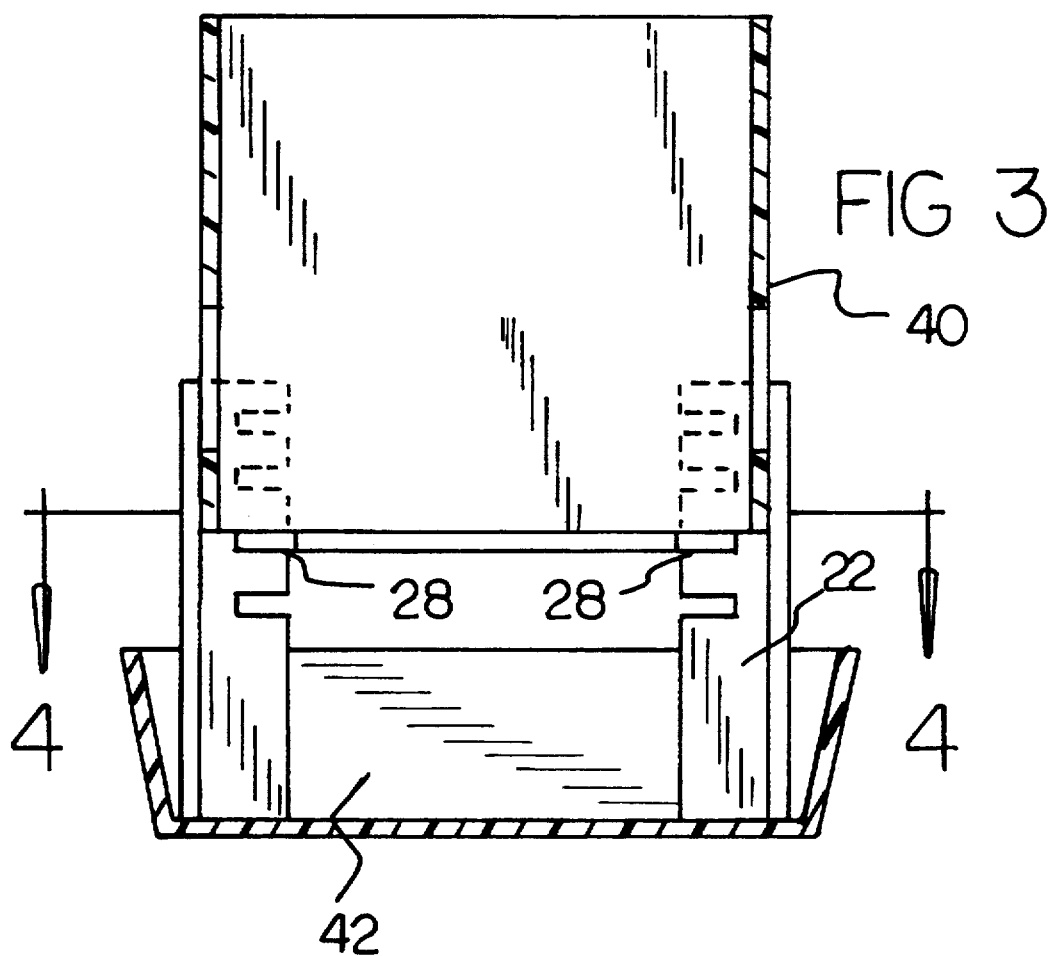
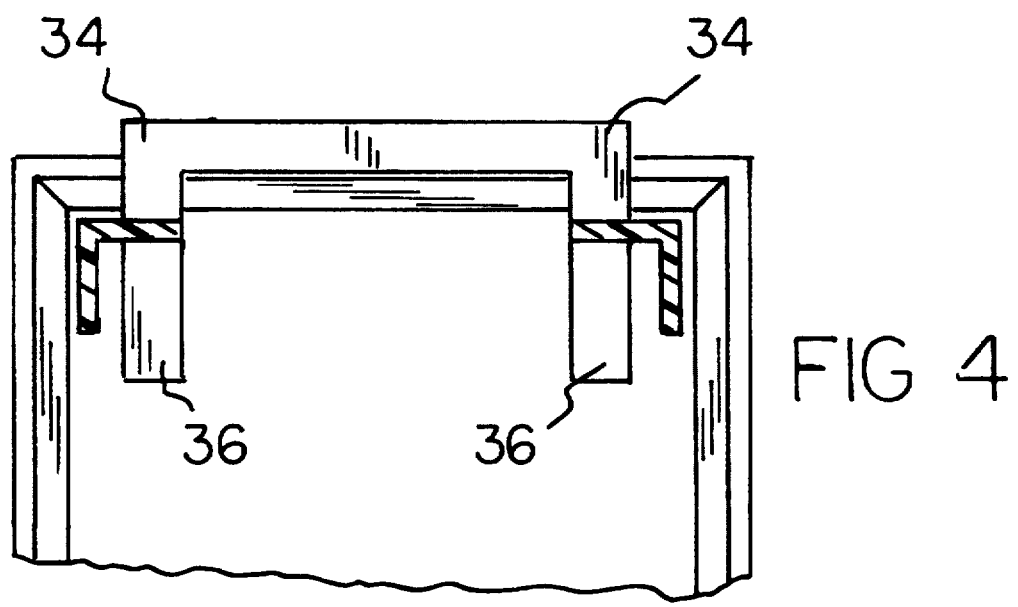

ADJUSTABLE ANIMAL FEEDER HOLDER

BACKGROUND OF THE INVENTION

1. Field of the Invention

The present invention relates to an adjustable animal feeder holder and more particularly pertains to preventing crawling insects from accessing an animal feeder placed on an adjustable animal feeder holder.

2. Description of the Prior Art

The use of animal food dishes and holders is known in the prior art. More specifically, animal food dishes and holders heretofore devised and utilized for the purpose of preventing crawling insects from accessing food are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,005,524 to Berry discloses a pet feed bowl construction. U.S. Pat. No. 5,031,575 to Phillips discloses an animal food dish. U.S. Pat. No. 5,069,166 to Ahuna discloses a pet dish. U.S. Pat. No. 5,113,798 to Rera discloses an animal feeding dish. U.S. Pat. No. 5,205,242 to Kasselman discloses a pet food container.

While these devices fulfill their respective, particular objective and requirements, the aforementioned patents do not describe an adjustable animal feeder holder that is adapted to hold an animal feeder above a moat of water for preventing crawling insects from accessing animal feed disposed in the feeder.

In this respect, the adjustable animal feeder holder according to the present invention substantially departs from the conventional concepts and designs of the prior art, and in doing so provides an apparatus primarily developed for the purpose of preventing crawling insects from accessing an animal feeder placed thereon.

Therefore, it can be appreciated that there exists a continuing need for new and improved adjustable animal feeder holder which can be used for preventing crawling insects from accessing an animal feeder placed thereon. In this regard, the present invention substantially fulfills this need.

SUMMARY OF THE INVENTION

In the view of the foregoing disadvantages inherent in the known types of animal food dishes and holders now present in the prior art, the present invention provides an improved adjustable animal feeder holder. As such, the general purpose of the present invention, which will be described subsequently in greater detail, is to provide a new and improved adjustable animal feeder holder and method which has all the advantages of the prior art and none of the disadvantages.

To attain this, the present invention essentially comprises, in combination, a generally rectangular pan having a bottom surface and an integral side wall extended upwards from the bottom surface. Two pairs of L-shaped legs are coupled to the bottom surface of the pan and extended upwards therefrom in a generally quadrature configuration. Each leg has a long rail and a cross rail thereadjacent with each long rail having a plurality of slots disposed along its length and positioned such that a given pair of symmetrically aligned slots on a given pair of legs is planarly aligned with a pair of symmetrically aligned slots on the other pair of legs. A pair of U-shaped brackets is included with each bracket having squared corners and free ends with the free ends inserted through a pair of symmetrically aligned slots on separate pairs of legs such that both brackets are planarly aligned and define a platform adapted for holding an animal feeder thereupon. When a animal feeder having animal feed disposed therein is placed upon the platform and water is disposed in the pan, a moat is created, and the moat prevents crawling insects from accessing the animal feed.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved adjustable animal feeder holder which has all the advantages of the prior art animal food dishes and holders and none of the disadvantages.

It is another object of the present invention to provide a new and improved adjustable animal feeder holder which may be easily and efficiently manufactured and marketed.

It is a further object of the present invention to provide a new and improved adjustable animal feeder holder which is of durable and reliable construction.

An even further object of the present invention is to provide a new and improved adjustable animal feeder holder which is susceptible of a low cost of manufacture with regard to both materials and labor, and which accordingly is then susceptible of low prices of sale to the consuming public, thereby making such an adjustable animal feeder holder economically available to the buying public.

Still yet another object of the present invention is to provide a new and improved adjustable animal feeder holder which provides in the apparatuses and methods of the prior art some of the advantages thereof, while simultaneously overcoming some of the disadvantages normally associated therewith.

Even still another object of the present invention is to provide a new and improved adjustable animal feeder holder for preventing crawling insects from accessing an animal feeder placed thereon.

Lastly, it is an object of the present invention to provide a new and improved adjustable animal feeder holder comprising a container having a bottom surface and an integral side wall extended upwards from the bottom surface; platform means coupled to the bottom surface of the container, extended upwards therefrom, and adapted for holding an animal feeder placed thereupon; and adjustable means coupled to the platform means for adjusting the height of the platform means above the container; whereby when an animal feeder having animal feed disposed therein is placed upon the platform means and liquid is disposed in the container, a moat is created, and the moat prevents crawling insects from accessing the animal feed.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a cross-sectional view of the present invention and animal feeder taken along the line 3—3 of FIG. 1.

FIG. 4 is a cross-sectional view of the pan, a bracket, and associated legs taken along the line 4—4 of FIG. 3.

The same reference numerals refer to the same parts through the various Figures.

DESCRIPTION OF THE PREFERRED EMBODIMENT

Figure 1:
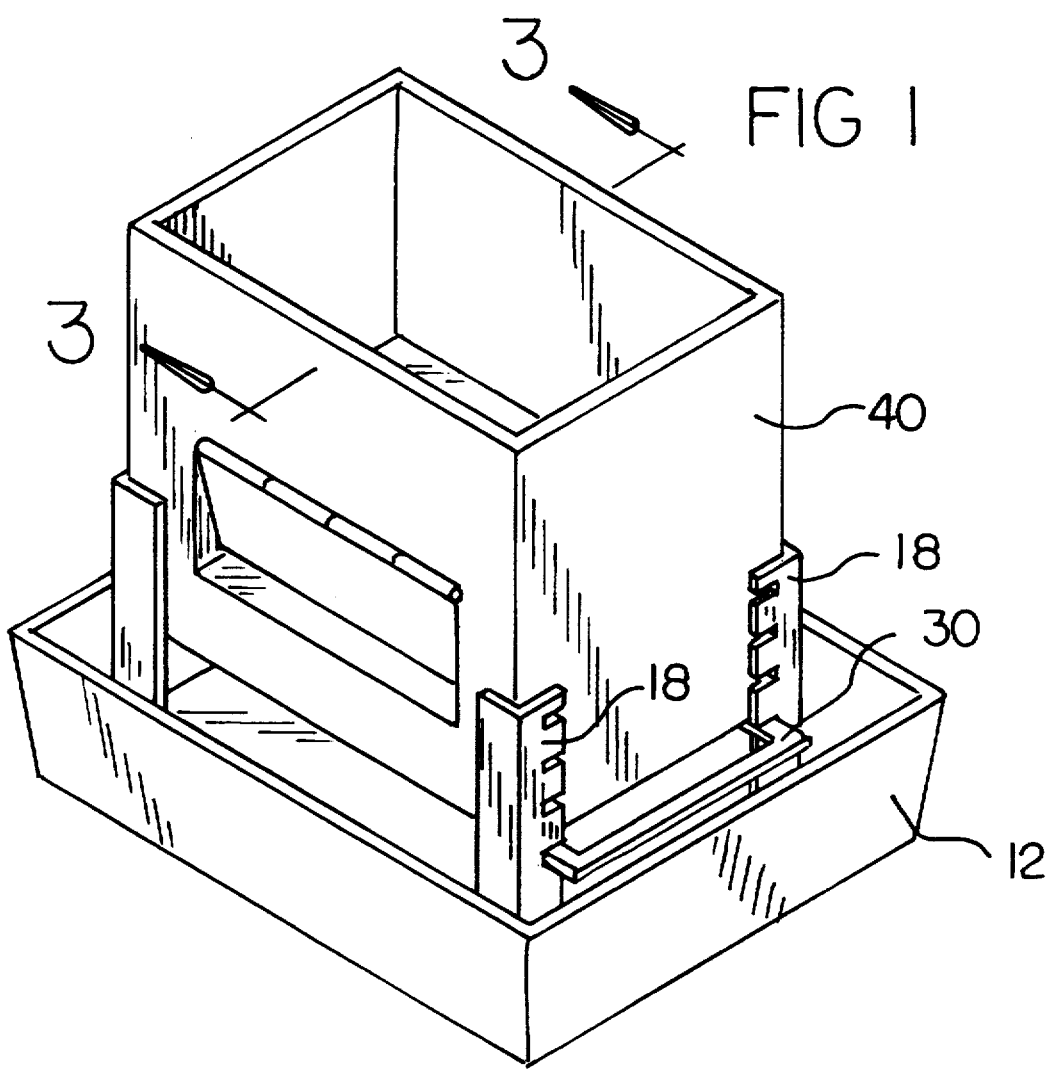
FIG. 1 is a perspective view of the preferred embodiment of the adjustable animal feeder holder constructed in accordance with the principles of the present invention in use with an animal feeder.
Figure 2:
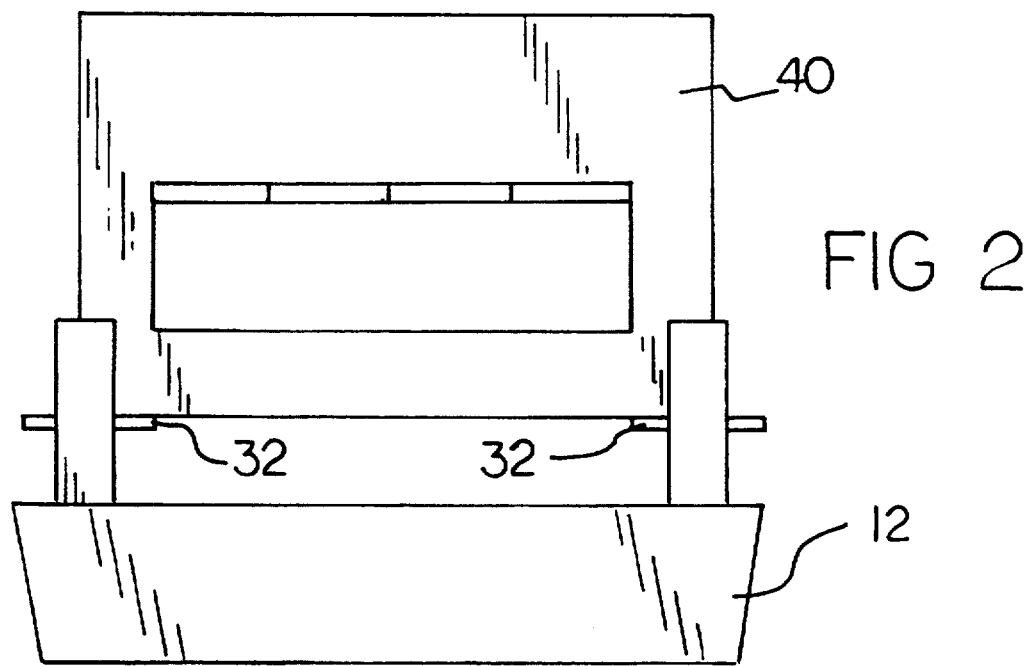
FIG. 2 is a side elevational view of the present invention in use with an animal feeder.
Figure 5:
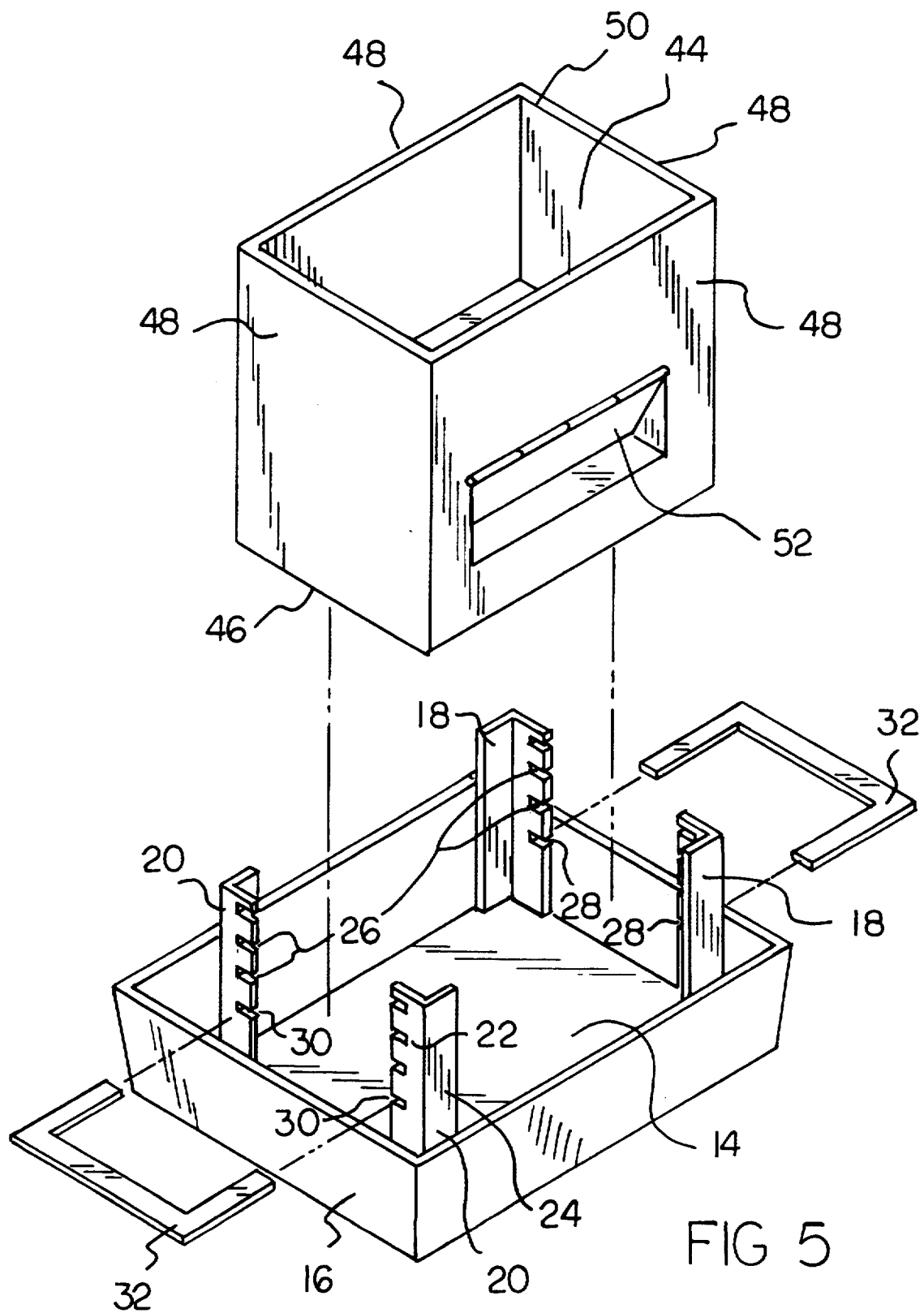
FIG. 5 is an exploded view of the present invention shown in FIG. 1.

With reference now to the drawings, and in particular, to FIG. 1 thereof, the preferred embodiment of the new and improved adjustable animal feeder holder embodying the principles and concepts of the present invention and generally designated by the reference number 10 will be described.

Specifically, the present invention includes 3 major components. The major components are the pan, legs, and brackets. These components are interrelated to provide the intended function.

More specifically, it will be noted in the various Figures that the first major component is the pan 12. The pan is generally rectangular and rigid in structure. It has bottom surface 14 and an integral side wall 16 extended upwards from the bottom surface. The integral side wall and bottom in combination form a basin adapted for holding water or other liquid therein.

The second major component is the legs. The present invention includes two pairs 18, 20 of legs. The legs are essentially L-shaped and rigid in structure. The legs are coupled near each corner of the bottom surface 14 of the pan. They are extended upwards therefrom in a generally quadrature configuration. The L-shaped structure of each leg is comprised of a long rail 22 and a cross rail 24 there adjacent. Each long rail has a plurality of spaced slots 26. These slots are disposed along the length of the long rail. The slots are positioned in a manner such that a given pair 28 of symmetrically slots on a given pair 18 of legs is plenarily aligned with a pair 30 of symmetrically aligned slots on the other pair 20 of legs.

The third major component is the U-shaped brackets 32. The present invention includes a pair of U-shaped brackets. Each bracket has squared corners 34 formed through the coupling of a elongated cross leg having two segments extended outwards from its ends. The segments are terminated at free ends 36. The free ends of each U-shaped bracket are inserted through a pair 28 of symmetrically aligned slots on a pair of legs such that both brackets are plenarily aligned. This configuration defines a platform. This platform is adapted for holding an animal feeder 40 thereupon. The brackets may be positioned in different pairs of holes along the extent of the legs to raise or lower the platform such that the feeder may be positioned at different heights to accommodate different sized animals.

The present invention is placed into operation with the following steps. First, an animal feeder is provided and placed upon the platform. Second, animal feed is disposed within the container. Lastly, water is then disposed in the pan. The basin of water in the pan creates a moat 42. The legs are extended upwards through the moat and offset from the periphery of the pan. The moat prevents crawling insects from accessing the animal feed in the animal container.

In the preferred embodiment, the pan is and approximately two inches deep. The height adjustment brackets are sized to fit within the slots of the legs. The animal feeder is a box-shaped food container that has a peripheral dimension slightly smaller and the peripheral extent defined by the upwardly extended legs. When in use, the animal feeder is placed just inside the corners of each leg, and the brackets are inserted into the slots to position the animal feeder at a height which best suits the size of the animal. It is upon these brackets that the animal feeder rests. Lastly, the pan is filled with water, soapy water, or some other harmless solution to a height just below the bottom surface of the animal feeder to define a moat for protecting feed in the container. If the pan is filled with water, it also serves as a supplemental reservoir from which an animal can drink. Using the present invention in this configuration, an animal is able to easily reach the food, while crawling insects such as ants are prevented from reaching the food. The present invention thereby eliminates the need to repeatedly discard the food in the animal feeder because of insect infestation.

A second embodiment of the present invention includes substantially all of the components of the present invention further including the animal feeder 40. The animal feeder has a hollow interior 44 bounded by a generally rectangular bottom surface 46 disposed upon the brackets 32 and four side walls 48 extended upwards from the bottom surface. The side walls terminate at an opening 50. The opening is adapted for receiving animal feed. The animal feeder includes a door 52 pivotally coupled to a side wall. The door is adapted for rotating inwards toward the interior for allowing an animal access to the animal feed when the animal applies a pushing force to the door. The second embodiment of the present invention thus provides a mechanism for feeding an animal that is not included as a part of the preferred embodiment.

In summary, the present invention is designed to hold an animal feeder in a position which is easily accessible to the animal but cannot be invaded by ants and other crawling insects. The preferred embodiment is simply comprised of a pan, four legs, and two height adjustment brackets. The animal feeder itself is a separate container that is conventional in design and commercially available. However, in a second embodiment the animal feeder is supplied as integral part of the present invention.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by LETTERS PATENT of the United States is as follows:

1. An adjustable animal feeder holder for preventing crawling insects from accessing an animal feeder placed thereon comprising, in combination:

an generally rectangular pan having a bottom surface and an integral side wall extended upwards from the bottom surface;

two pairs of L-shaped legs coupled to the bottom surface of the pan and extended upwards therefrom in a generally quadrature configuration, each leg having a long rail and a cross rail thereadjacent, each long rail having a plurality of slots disposed along its length and positioned such that a given pair of symmetrically aligned slots on a given pair of legs is planarly aligned with a pair of symmetrically aligned slots on the other pair of legs; and a pair of U-shaped brackets, each bracket having squared corners and free ends with the free ends inserted through a pair of symmetrically aligned slots on separate pairs of legs such that both brackets are planarly aligned and define a platform adapted for holding an animal feeder thereupon;

whereby when an animal feeder having animal feed disposed therein is placed upon the platform and water is disposed in the pan, a moat is created, and the moat prevents crawling insects from accessing the animal feed.

2. An adjustable animal feeder comprising, in combination;

an generally rectangular pan having a bottom surface and an integral side wall extended upwards from the bottom surface;

two pairs of L-shaped legs coupled to the bottom surface of the pan and extended upwards therefrom in a generally quadrature configuration, each leg a long rail and a cross rail thereadjacent, each long rail having a plurality of slots disposed along its length and positioned such that a given pair of symmetrically aligned slots on a given pair of legs is planarly aligned with a pair of symmetrically aligned slots on the other pair of legs;

a pair of U-shaped brackets, each bracket having squared corners and free ends with the free ends inserted through a pair of symmetrically aligned slots on separate pairs of legs such that both brackets are planarly aligned and define a platform adapted for holding a animal feeder thereupon; and an animal feeder having a hollow interior bounded by a generally rectangular bottom surface disposed upon the platform and four side walls extended upwards from the bottom surface and terminated at an opening adapted for receiving animal feed, the animal feeder further having a pivotal door disposed on a side wall adapted for rotating inwards toward the interior for allowing access to the animal feed when a pushing force is applied thereto;

whereby when water is disposed in the pan, a moat is created, and the moat prevents crawling insects from accessing animal feed placed in the animal feeder.

* * * * *